Jan. 14, 1969  O. O. HEMBREE  3,421,538
LIQUID LEVEL CONTROL
Filed Feb. 10, 1966  Sheet 1 of 2

INVENTOR.
OSCAR O. HEMBREE

BY  *Head & Johnson*

ATTORNEYS

Jan. 14, 1969  O. O. HEMBREE  3,421,538
LIQUID LEVEL CONTROL
Filed Feb. 10, 1966

INVENTOR.
OSCAR O. HEMBREE
BY *Head & Johnson*
ATTORNEYS

United States Patent Office 3,421,538
Patented Jan. 14, 1969

3,421,538
LIQUID LEVEL CONTROL
Oscar O. Hembree, Owensboro, Ky., assignor to
Talmage Hocker, Owensboro, Ky.
Filed Feb. 10, 1966, Ser. No. 526,460
U.S. Cl. 137—394    4 Claims
Int. Cl. F16k *21/18;* H01h *35/40;* G01f *23/00*

ABSTRACT OF THE DISCLOSURE

This invention relates to an improved liquid level control. More particularly, the invention relates to an improved liquid level control for location in a liquid container providing switching action when the liquid level reaches a predetermined height and an opposite switching action when the liquid level reaches a predetermined low point, the control including a tubular casing having an inlet at the top and an outlet at the bottom, a solenoid actuated valve controlling flow through the lower outlet, a pressure actuated switch in the lower portion of the casing above the solenoid having electrical contacts which close when the casing becomes filled with fluid as fluid flows in the upper inlet to actuate a pump or other apparatus and at the same time opens the solenoid valve so that as fluid level is lowered in the container the same level is lowered within the casing, the switch serving to open when the fluid level reaches a predetermined low point to close the solenoid valve.

---

This invention relates to an improved liquid level control. More particularly, the invention relates to a switching mechanism for location in a fluid container or reservoir, such as a tank, oil well, or otherwise, providing an improved switching action when the fluid level reaches a predetermined high point and an opposite switching action when the fluid level reaches a predetermined low point.

The switching mechanism of this invention will be particularly described as it is applicable to control the level of liquid in a tank, it being understood, however, that the invention is not limited to this exemplified application. In the broadest sense, the device of this invention may be utilized to control the liquid level in any vessel, reservoir, or container, such as chemical tanks, water reservoirs, sump pumps, oil wells, water wells, or from any enclosure which contains liquid wherein it is desired to maintain the liquid level between a preselected maximum and minimum point.

Many industrial applications require the control of liquid between preselected maximum and minimum points. For instance, water reservoirs frequently require switching mechanisms to energize a pump when the water reaches a low point to fill the reservoir and deenergize the pump when the water reaches a high point. Sump pumps work oppositely and require pumps to be energized to evacuate a reservoir when the liquid reaches a high point and to deenergize the pump when it reaches a low point. Oil wells are optimately pumped in such a manner, that is, the oil well pump is energized when the fluid in the well reaches a selected high point, and deenergized when the fluid reaches a selected low point. These are merely examples of the multitude of applications for the device of this invention for controlling fluid level between selected minimum and maximum points.

It is therefore an object of this invention to provide an improved liquid level control. More particularly, an object of this invention is to provide an improved liquid level control including means of performing a switching action when liquid reaches a predetermined high point and opposite switching action when liquid reaches a predetermined low point.

Another object of this invention is to provide an improved liquid level control including an improved solenoid valve.

Another object of this invention is to provide an improved liquid level control including an improved pressure switch.

Another object of this invention is to provide an improved pressure switch of a type adaptable for use in liquid level controls and other similar devices, the switch being responsive to external hydrostatic pressure.

These and other objects and a better understanding of the invention will be had by referring to the following description and claims taken in conjunction with the attached drawings in which:

Figure 1:
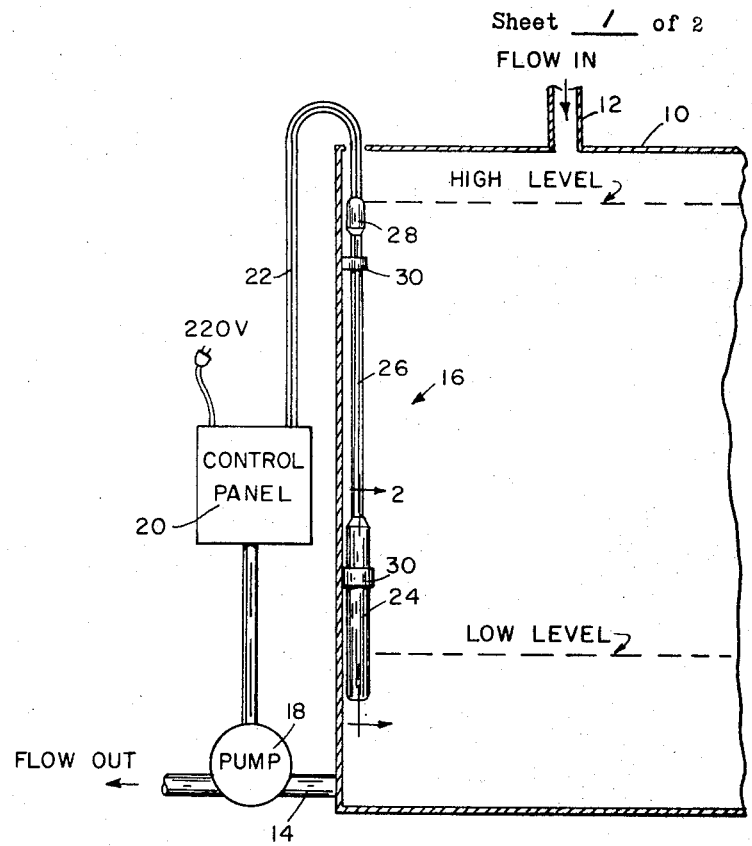
FIGURE 1 is a view of the switch mechanism of this invention utilized in conjunction with a tank for controlling the low and high level of liquid within the tank.

Referring to the drawings, and first to FIGURE 1, the switch of this invention is shown as it is utilized in conjunction with the liquid containing tank 10. Fluid flows into the fluid tank 10 through inlet 12 and out through outlet 14. As the level rises to a predetermined high point, the switch mechanism of this invention, indicated generally by the numeral 16, energizes a pump 18 to pump the liquid in the tank 10 back down to its preselected low level.

Pump 18 is controlled by means of a control panel 20 connected by conductors 22 to the switch 16.

The switch 16 of this invention includes a lower valve housing portion 24, an intermediate connecting tubular portion 26, and an upper inlet portion 28. The switch 16 may be supported to the interior wall of tank 10 such as by means of straps 30.

Figure 2:
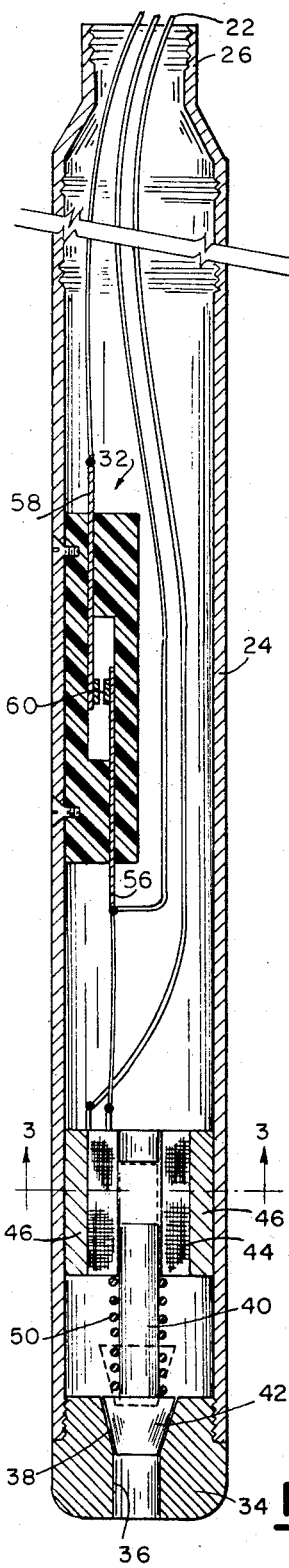
FIGURE 2 is a cross sectional view taken along the line 2—2 of FIGURE 1 showing an enlarged view of the lower portion of the switch mechanism of this invention.

Referring to FIGURE 2, the lower portion of the switch of the invention in which all of the functioning parts are included is shown in enlarged cross sectional view. Affixed to the interior of the valve housing portion 24 is an improved pressure switch generally indicated by the numeral 32, which will be described in greater detail subsequently. Closing the lower end of the valve housing portion 24 is an annular seating member 34 having an axial opening 36 therein defining, in part, a seating surface 38.

Supported above the seating member 34 is the longitudinally movable plunger member 40 having, at the lower end thereof, a valve closing element 42, which, when in the non-energized position, engages seating surfaces 38. A solenoid 44 is positioned within the housing 24 and slidably receives plunger 40. When the solenoid 44 is energized plunger 40 is more fully withdrawn moving the closing element 42 from valve seat 38 and permitting fluid flow through opening 36.

Figure 3:
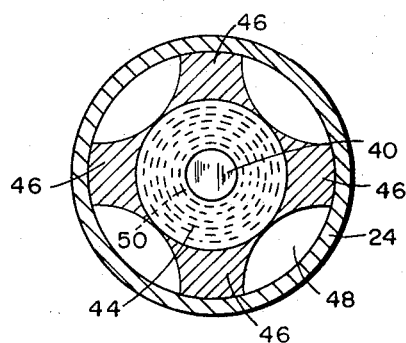
FIGURE 3 is a cross sectional view taken along the line 3—3 of FIGURE 1 showing a portion of the solenoid valve of this invention.

As shown in FIGURE 3, the solenoid 44 is of a reduced diameter, less than the internal diameter of the housing 24, and is spaced from the housing with spacers 46 providing flow passageways 48 therebetween so that when the solenoid is energized, retracting plunger 40, fluid within the housing portion 44, and the tubular portion 26 above it, may drain from therewithin and pass externally of the switching member through opening 36.

Referring again to FIGURE 2 in the lower part thereof, a spring 50 is shown extending compressible between the solenoid 44 and the closing element 42. The function of spring 50 is to normally urge the plunger closing element into closed position against seat 38. This prevents fluid flow through passage 36 except when the solenoid is energized.

Figure 4:
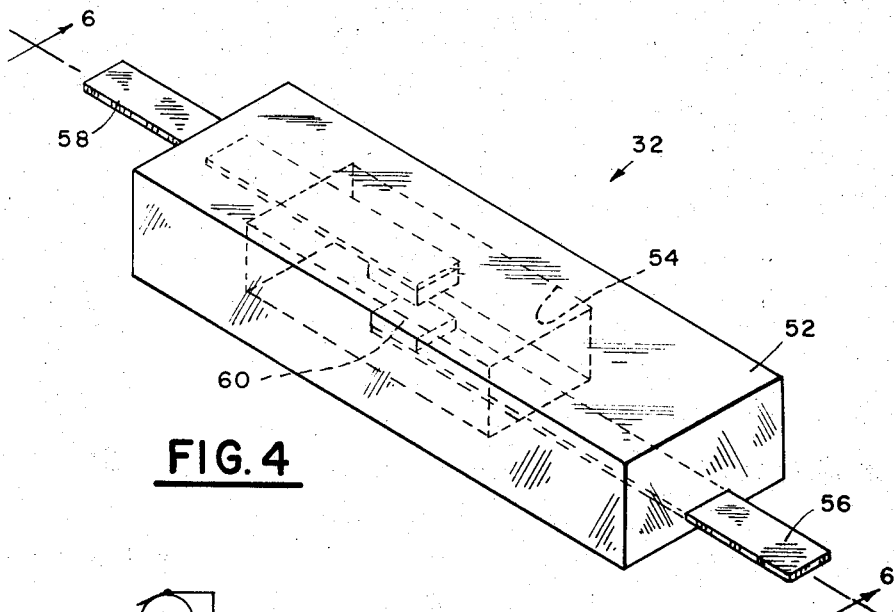
FIGURE 4 is an enlarged external isometric view of the improved pressure switch of this invention.

The pressure switch 32 is shown in an enlarged view in FIGURE 4. Basically the switch includes a body of deformable leakproof material 52. The substance of which body 52 may be formed includes a variety of materials, the criteria being that such materials be not affected by the liquid or gas in which the switch is placed and that the material be leakproof and deformable under pressure. Rubberized plastic meets these requirements. The body 52 may be of virtually any external shape but is preferably of an arrangement so that in cross section it is flat and includes a hollow void 54 therein. The void has a flat cross sectional configuration conforming to the flat external cross sectional configuration of the body 52.

Figure 6:
FIGURE 6 is a cross sectional view taken along the line 6—6 of FIGURE 4 showing the pressure switch of this invention as it is actuated by externally applied hydrostatic pressure.

Supported by the body 52 are a first and second conducting element 56 and 58 which extend within the body and into void 54. At least a portion of each of the elements 56 and 58 extends in overlapping spaced relationship within the void. Each of the conductive elements 56 and 58 may be provided with a contact point 60 in juxtaposed spaced relationship. The resilient body 52 normally holds the conductive elements 56 and 58 spaced from each other and in non-conductive relationship. However, when external hydrostatic pressure is applied to the body 52, either by liquid or gas, the body deforms by such externally applied pressure so that the conductive elements 56 and 58 contact each other within the void 54, closing the switch. FIGURE 6 shows the appearance of the switch in cross section as it is deformed by an externally applied hydrostatic pressure causing the contact elements 56 and 58 to engage each other in conductive relationship.

While the invention is illustrated by means of a switch which is normally open under low pressure and closes under high pressure, it obviously may be arranged such that the switch is deformed to provide open contact in the presence of high hydrostatic pressure.

Operation

Figure 5:
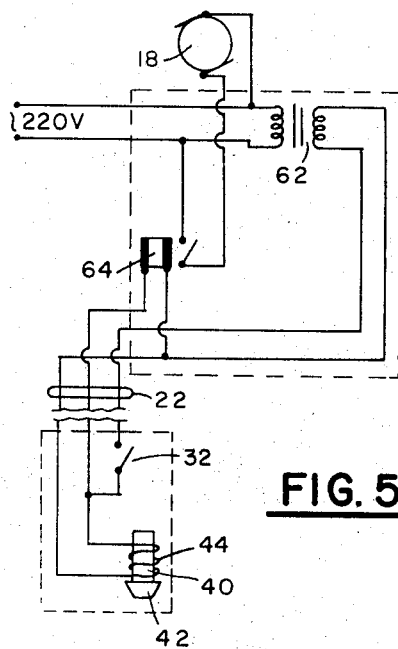
FIGURE 5 is a rudimentary wire diagram showing the method of utilizing the switch of this invention according to the application illustrated in FIGURE 1 for controlling liquid level in a tank.

Referring to FIGURE 1, when the liquid reaches the indicated high level, fluid will flow into inlet 28, down through tubular portion 26, into the valve housing portion 24, and will apply hydrostatic pressure to switch 32, deforming it to the closed position, indicated in FIGURE 6. As shown in the circuit diagram of FIGURE 5, when switch 32 closes, voltage supplied by transformer 62 energizes a relay 64 which in turn energizes pump 18. At the same time solenoid 44 is energized, withdrawing plunger 40. This opens the seating member 34 and allows fluid in the tubular portion 26 and valve housing portion 24 to flow out as the fluid level in tank 10 drops. When the fluid level has lowered sufficiently, the hydrostatic closing pressure on switch 32 is removed and the switch opens by the resilient effect of the body material 52. This deenergizes solenoid 44 and permits the plunger to close against seating surface 38. At the same time relay 64 is deenergized thereby deenergizing pump 18. If fluid continues to flow into tank 10 the level will rise but the rising fluid level will not affect the switch 32 since fluid flow into the bottom of the housing since it is closed by valve closing element 42. When the level reaches the predetermined high point it will flow again into the upper inlet portion 28 and start the cycle over again.

The arrangement of the plunger 40, solenoid 44 and seating member 34 has important advantages. When the fluid flows through inlet portion 28 and downwardly into the valve housing 24 it first applies hydrostatic pressure to switch 32, and the solenoid 44 is energized and plunger 40 is withdrawn, opening the lower end of the housing. This usually will occur before the housing is completely filled with liquid and the pressure outside the housing 24, being greater than the inside pressure, will cause some amount of fluid to rush upwardly through opening 36. This forms a backwash action which, coupled with the subsequent flow downwardly through the opening, always completely washes the plunger 40 and seating surface 38 so that there is no possibiilty of accumulation of foreign material to prevent the leakproof closing of the valve.

Another important feature of the improved liquid level control of this invention is the improved pressure switch 32. This switch is of ultimate simplicity, having only the three basic components of a body and two conductive elements 56 and 58 supported by the body. The switch is not only extremely economical but is substantially indestructable and fail proof. The switch requires no external devices for its operation and functions by hydrostatic pressure applied either by liquids or gases.

Figure 7:
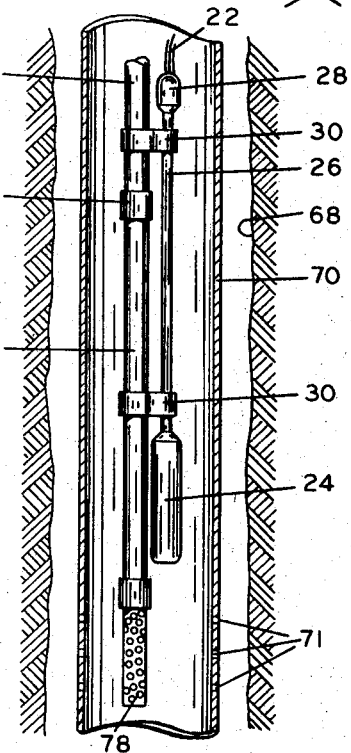
FIGURE 7 is a view of a well hole in which the apparatus could be applied to control liquid flow.

As previously stated, the improved liquid level control of this invention may be utilized to control the pumping of an oil well, which application is illustrated in FIGURE 7. A well hole 68 has a casing 70 therein, having perforation 71 by which fluid flows into the casing. Fluid is conveyed to the surface by a tubing string 72, having a pump 74 supported at the lower end thereof by coupling 76. Typically, sucker rods (not shown) are reciprocated within tubing 72 actuating pump 74. Fluid flows into the pump through perforated nipple 78. The liquid level control is attached to the exterior of the pump 74 or tubing 72 by straps 30 and functions exactly as previously described with reference to the tank of FIGURE 1. When fluid rises in the well casing 70 to a level to enter inlet portion 28 the pump is energized by means of conductors 22 extending to the surface. When the fluid level in the well is pumped to the low level at which the hydrostatic pressure allows the pressure switch to open the pump stops. It will not be restarted until the fluid level again reaches the level of inlet portion 28.

While the invention has been described with a certain degree of particularity it is manifest that many changes may be made in the details of construction and the arrangement of components without departing from the spirit and scope of this disclosure.

What is claimed:

1. An improved liquid level control for location in a liquid container providing a switching action when the liquid level reaches a predetermined height and an opposite switching action when the liquid level reaches a predetermined low point, comprising:

a tubular casing having an inlet at the top and an outlet at the bottom;

an annular valve seating member sealably closing the lower end of said casing, said seating member having an axial opening therethrough defining a seating surface;

a longitudinally movable plunger member supported within said casing and adjacent and above said seating member, said plunger member having an integral valve closing element at the lower end thereof sealably engageable with said seating member seating surface;

a solenoid slidably receiving the upper end of said plunger member wherein when said solenoid is energized said plunger is more fully withdrawn upwardly within the solenoid displacing the said closing element away from said seating member seating surface;

a switch body of deformable leakproof material having a void therein supported in the lower portion of said casing and above said solenoid;

a first and a second conducting element supported by said switch body and extending into said void in overlapping juxtaposed relationship, said body normally supporting said conducting elements in spaced, non-contacting relationship, and said body deformable by external pressure so that said conducting elements are moved into contacting relationship;

electrical means of controlling said solenoid; and electrical circuit means connecting said switch and said solenoid to a power source whereby when the liquid level rises to the inlet of said casing causing liquid to enter said casing, said switch is actuated, energizing said solenoid and wherein as the liquid level is lowered in said casing, said switch is actuated to close said valve.

2. An improved liquid level control according to claim 1 including spring means normally biasing said valve closed.

3. An improved liquid level control according to claim 1 including a relay means in parallel with said solenoid valve.

4. An improved liquid level control according to claim 1 wherein said switch body is of rubberized plastic material.

References Cited
UNITED STATES PATENTS

| | | | |
|---|---|---|---|
| 2,275,473 | 3/1942 | Scaramucci | 200—83 X |
| 2,321,012 | 6/1943 | Crecca | 200—83 |
| 2,968,707 | 1/1961 | Martin et al. | 103—25 X |
| 3,285,183 | 11/1966 | Hembree et al. | 103—25 |
| 3,318,247 | 5/1967 | Yost | 137—403 X |

WILLIAM F. O'DEA, *Primary Examiner.*

D. R. MATTHEWS, *Assistant Examiner.*

U.S. Cl. X.R.

137—392; 200—83; 73—299; 103—25